United States Patent [19]

Arndt et al.

[11] Patent Number: 5,708,654
[45] Date of Patent: Jan. 13, 1998

[54] METHOD FOR DETECTING PROXY ARP REPLIES FROM DEVICES IN A LOCAL AREA NETWORK

[76] Inventors: Manfred R. Arndt, 920 Haverhill Pl., Colorado Springs, Colo. 80919; Frank J. Actis, 9145 Melbourne Dr., Colorado Springs, Colo. 80920

[21] Appl. No.: 756,994

[22] Filed: Nov. 27, 1996

[51] Int. Cl.⁶ .................................................. H04J 3/14
[52] U.S. Cl. .............................. 370/242; 370/245; 370/402
[58] Field of Search ...................................... 370/254, 255, 370/257, 258, 351, 389, 392, 400, 401, 402, 403, 404, 405, 406, 407, 408, 409, 410, 256, 522, 241, 242, 245, 243, 252, 475, 244, 247, 246, 250; 340/825.06, 825.07, 825.08, 825.52, 825.53, 825.54; 395/200.16, 410, 413, 416, 421.11

[56] References Cited

U.S. PATENT DOCUMENTS

| | | |
|---|---|---|
| 5,229,988 | 7/1993 | Marbaker et al. |
| 5,309,437 | 5/1994 | Perlman ............................ 370/401 |
| 5,420,862 | 5/1995 | Perlman ............................ 370/401 |
| 5,517,488 | 5/1996 | Miyaza ............................. 370/409 |
| 5,581,552 | 12/1996 | Civanlar et al. .................. 370/396 |
| 5,600,644 | 2/1997 | Chang et al. ..................... 370/404 |

Primary Examiner—Wellington Chin
Assistant Examiner—Huy D. Vu
Attorney, Agent, or Firm—Douglas J. Barker

[57] ABSTRACT

A method in a LAN test instrument for detecting proxy ARP agents and misconfigured routers in a TCP/IP LAN is provided. The method first allows for detection of routers running proxy ARP for the default route by issuing a single ARP command for a unique remote host. Because the target IP address chosen as a unique, non-existent device, the router will respond to the ARP request with a proxy ARP reply for its default route if this function is enabled. The method further allows for distinguishing between responses from actual devices having duplicate IP addresses and responses from misconfigured routers replying in proxy ARP for local hosts. The false duplicate IP addresses due to proxy ARP replies may be identified as phantom entries in a data base that can then be appropriately tagged or eliminated to display only the entries that correspond to actual physical devices to the user of the LAN test instrument.

15 Claims, 7 Drawing Sheets

METHOD FOR DETECTING PROXY ARP REPLIES FROM DEVICES IN A LOCAL AREA NETWORK

BACKGROUND OF THE INVENTION

This invention relates generally to local area network (LAN) test equipment and in particular to a method for detecting proxy ARP replies by devices on the LAN.

Increasingly complex LANs now connect more and more types of devices including personal computers, work stations, file servers, and printers. Network hubs are often the central devices in a network through which information flows. Each client device connects to the LAN via adapters called network interface cards (NICs) to form devices. Connecting the devices to the hubs are network links which may include unshielded twisted pair (UTP) wire, coaxial cable, and fiber optic cable.

Network protocols for controlling the communication of information between the devices have been developed, including Ethernet which is defined according to the IEEE 802.3 standard and Token Ring which is defined according to the IEEE 802.5 standard. Ethernet uses a method called carrier-sensing multiple access with collision detection (CSMA/CD) to control information flow and resolve collisions between devices. A device can send information on the network only if no other device is currently sending information. If a device tries to send information at the same time as another device, a collision occurs and each device operates according to a defined "back off" procedure to resolve the collision. Each device will wait a random period of time to attempt to send the information again.

Because Ethernet is typically implemented in a baseband, broadcast network, every device receives the information sent by every other device within the collision domain. In order to minimize the burden on the software operating in host personal computers (PC's) connected to the network, a hardware layer with a hardware or media access control (MAC) address passes along to the software layer only the information appropriate for that device. Such information may be in the form of a "broadcast" message intended for all devices in the network or as a message only for the target device with the appropriate MAC address.

Information sent over an Ethernet network is in the form of discrete packets defined according to the seven layer Open Systems Interconnection (OSI) standard maintained by the American National Standards Institute (ANSI). OSI is a layered structure in which the highest layers take advantage of the capabilities of the lower layers to send information between devices. Information is passed between devices in the form of discrete packets containing data or control information supplied by the various OSI layers. The highest layers are the Application layer, the Presentation layer, and the Session layer which may include Telnet, File Transfer Protocol (FTP), Simple Mail Transfer Protocol (SNMP), and Domain Name System (DNS).

The Transport layer typically includes the Transmission Control Protocol (TCP) along with the User Datagram Protocol (UDP), among others, which provide for the delivery of the data to a desired device and the division of the information into discrete packets for sending. Received packets are reassembled in a like manner. The Network layer routes messages back and forth between a source device and a destination device according to Internet Protocol (IP) addresses by adding an IP header to each packet indicating the source and destination IP addresses. The lowest layer is the physical link layer in which the hardware MAC addresses are used.

Maintaining unique MAC and IP addresses for each device is critical for proper functioning of the network. MAC addresses are commonly understood to be 48 bits in length while IP addresses are 32 bits in length. MAC addresses are hardware addresses, not readily changeable, which are assigned according to the manufacturer in the manner of a serial number. Duplicate MAC addresses thus rarely present any problems in actual applications.

IP addresses, on the other hand, are designed to be changed dynamically. IP addresses are often assigned when a client PC is booted up on the LAN and an IP address is often allocated to the client by a dynamic host configuration protocol (DHCP) server or a boot protocol (BOOTP) server. Such an allocation method uses a table of predetermined unique IP addresses which usually avoids the problem of duplicate IP addresses. However, duplicate IP addresses continue to occur, particularly in network devices that do not go through the boot-up process in which the IP address would normally be allocated, such as printers or routers. A duplicate IP address problem is one in which two devices with different MAC addresses have the same IP address.

When a source device has information to communicate to a target device on the LAN, the dynamic nature of the IP address allocation requires that the current IP address of the target device be mapped to its MAC address. This mapping is achieved by the source device sending an ARP request which is broadcast to all devices on the local segment of the LAN which requests that the device having the target IP address respond with its MAC address. Normally, only one such target device will respond and the communications session can then begin.

A local segment of a LAN is one in which all devices may directly communicate with each other and share a common collision domain. Devices on a remote segment of a LAN are connected to devices on the local segment via routers or switching hubs or other network connectivity devices. Thus, any segment may be local or remote, depending on the particular source and destination devices that are attempting to communicate. Routers are commonly used to connect local and remote segments of a LAN system by selectively passing data traffic between the local and remote segments based on the source and destination IP addresses of the devices connected to each segment. Within the router, destination IP addresses are normally stored in a data base called a router table. The ARP request from the source device is only broadcast on the local segment and is not forwarded by the router to the remote segments.

In order to facilitate the connection between a source device on a local segment and a target device on a remote segment, particularly with devices having older implementations of TCP/IP, it is common to accommodate the ARP request from the source device so that communications can be established in a compatible and transparent fashion. Routers that connect local and remote segments operate by forwarding packets based on IP addresses stored in its router table. Such routers commonly employ a proxy ARP function which replies in proxy for a target device that is not on the local segment in response to the ARP request from the source device.

In response to an ARP request on a local segment for a target IP address of a device on a remote segment that appears in the router table, the router replies with its own MAC address rather than the MAC address of the target device. The router then relays the packets to the target device from the source device as if the target device were on the local segment, thereby allowing communication between devices on different segments using the standard ARP request. Routers implement the proxy ARP function using proxy ARP agents that reply in proxy for a target device responsive to an ARP request sent by the source device on the local segment of the LAN.

Routers do not normally reply to ARP requests sent for target devices that are on the local segment. However, a router that is misconfigured will send a proxy ARP reply for a target device on the local segment ("local host") in tandem with the ARP reply from the target device, thereby creating a condition that resembles a duplicate IP address problem. The source device thus receives two replies to its ARP request to the target IP address, one from the target device with its MAC address and the other from the router with its MAC address. The order in which the two replies are received by the source device is indeterminate and may depend on the particular devices being used along with the network configuration. Although the misconfigured router may forward the communications in a seemingly normal manner between the source and target devices on the same segment, such an operation is inefficient, wastes network bandwidth, and may result in a broadcast storm if multiple routers are involved in forwarding broadcast packets back onto the local segment.

A misconfigured router on a large LAN may generate proxy ARP replies for a large number of devices which may be mistaken for duplicate IP address problems. It is usually not desirable to view entries in the data base generated by proxy ARP replies because they are generated by the misconfigured router and not by other devices on the LAN. The tasks of analyzing and troubleshooting the LAN are made more difficult without first sorting out and rejecting proxy ARP replies. It may also be desirable to detect a router running proxy ARP for local hosts so that the misconfigured router can be properly configured.

U.S. Pat. No. 5,229,988, "System And Method For Distinguishing Proxy Replies Of Interconnecting Devices From Duplicate Source Address Replies Of Non-Interconnecting Devices On A Network", issued Jul. 20, 1993, to Marbaker et al., Hewlett-Packard Company, assignee, discloses a system and method for distinguishing duplicate source address replies caused by interconnecting devices such as routers from replies due to devices having duplicate IP addresses. Marbaker et al. requires the sending of an ARP request for a target IP address, storing the responses in a first set, sending a second ARP request for a second IP address close to the target IP address, storing the responses in a second set, and then comparing the first and second sets to find unique responses related to duplicate IP addresses. It is critical that the second IP address be chosen so that the router will reply reliably to the second ARP request to reveal the proxy ARP reply. This method thus may not reliably distinguish a duplicate IP address from a proxy ARP reply.

Therefore, it would be desirable to provide a LAN test instrument that may be inserted into a LAN which has the improved ability to detect proxy ARP agents by using active network requests that distinguish local and forwarded replies. It would be further desirable to provide a LAN test instrument that has a greater ability to reliably distinguish between the replies from misconfigured routers and from devices having duplicate IP addresses on the LAN by sending the active network requests only to the IP addresses in question.

SUMMARY OF THE INVENTION

In accordance with the present invention, a method in a LAN test instrument for detecting proxy ARP agents and misconfigured routers in a LAN is provided. The LAN test instrument is inserted into the LAN either at boot up or by physical connection to an operating LAN and configured for a valid IP address. The LAN may be running Ethernet, Token Ring, or other communications protocol which uses hardware and software addresses for the devices or devices connected to the LAN and a higher level protocol suite collectively referred to as TCP/IP.

The communication protocol known as ICMP (Internet Control and Message Protocol) which is used by every device that uses IP is taken advantage of because the number of times a packet may be forwarded, known as time-to-live (TTL) may be set as desired. The ICMP echo request, an active network request, is used, first with a TTL equal to one and then with a TTL substantially larger than one to distinguish IP addresses associated with a proxy ARP reply. Other active network requests, such as UDP ping and SNMP ping, could also be used in a similar manner to the ICMP echo request.

The method first allows for detection of routers running proxy ARP for the default route. A single ARP command for a unique remote host is issued on the LAN. A router connected to the LAN will receive the ARP request, search its router table for the remote host, and, because the target IP address chosen as a unique, non-existent device, the router will respond to the ARP request with a proxy ARP reply for its default route if this function is enabled. The default route is typically the IP address of a router "downstream" to allow the connection to be found by another router having the address of the target device in its router table. The proxy ARP reply may then be used to obtain the MAC address and subsequently the matching IP address of the router which is information useful to the user of the LAN test instrument and to other processes within the LAN instrument for identifying phantom entries that are due to proxy ARP replies.

The method next allows for detection of phantom entries in a data base. The LAN test instrument will typically compile a data base containing entries, with each entry containing a MAC and IP address pair corresponding to the devices on the LAN, typically through passive monitoring of traffic on the LAN and through active network requests to the devices on the LAN. Entries having duplicate IP addresses or common MAC addresses within the data base may be further investigated according to the method of the present invention to distinguish between responses from actual devices having duplicate IP addresses or secondary IP addresses and responses from routers replying in proxy ARP. It is possible for router interfaces that have a single MAC address to have multiple secondary IP addresses to facilitate communications within the LAN.

The duplicate IP addresses that are found may be the result of a router connected to the local segment that is improperly replying in proxy ARP for a local host that is also replying in response to an ARP request sent by the LAN test instrument. The false duplicate IP addresses due to proxy ARP replies which appear as phantom entries in a data base can then be appropriately tagged or eliminated from the data base to display only the entries that correspond to actual physical devices to the user of the LAN test instrument.

The present invention may be practiced as a stand-alone method or used in conjunction with other methods such as methods for searching out and identifying duplicate IP addresses which appear as entries in the data base. The present invention is an improvement over the prior art by allowing for more reliable detection of proxy ARP replies.

Possible duplicate IP addresses can be analyzed according to the present invention using a series of active network requests directed to known IP addresses that appear as entries in the data base. The present invention further allows for the detection of misconfigured routers by using network requests that distinguish between proxy ARP replies and replies from local hosts on the basis of the time-to-live parameter setting of the ICMP echo request.

One object of the present invention is to provide a method for automatically identifying proxy ARP agents in a LAN.

Another object of the present invention is to provide a method for distinguishing between replies from devices have duplicate source IP addresses and proxy ARP replies.

An additional object of the present invention is to provide a method for detecting phantom entries in a data base of MAC and IP pairs in a LAN test instrument.

A further object of the present invention is to provide a LAN test instrument capable of detecting proxy ARP agents and misconfigured routers as distinguished from duplicate IP address problems in a LAN.

Other features, attainments, and advantages will become apparent to those skilled in the art upon a reading of the following description when taken in conjunction with the accompanying drawings.

DETAILED DESCRIPTION OF THE INVENTION

Figure 1:
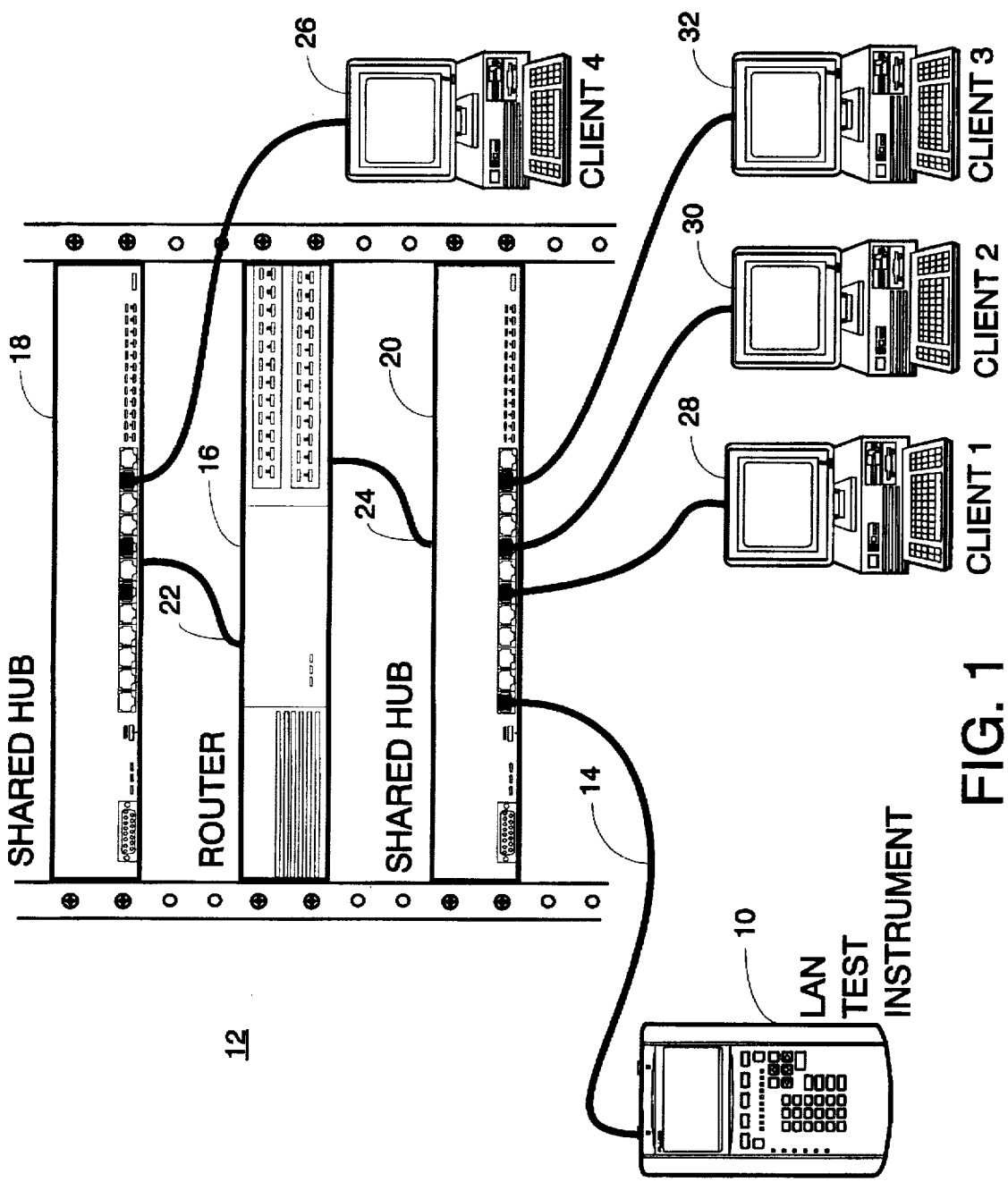
FIG. 1 is an illustration (not to scale) showing a typical situation in which a LAN test instrument is inserted into a LAN to detect duplicate IP addresses.

FIG. 1 is an illustration (not to scale) of a LAN test instrument 10 that is connected to a LAN 12 via a patch cord 14. The LAN 12 is collectively formed from a router 16, a shared hub 18, and a shared hub 20. The shared hub 18 is coupled to the router 16 via a patch cord 22 and the shared hub 20 is coupled to the router 16 via a patch cord 24. Device 26, labeled Client 4 is connected to shared hub 18 to form a segment of the LAN. Devices on the segment share a collision domain and may communicate directly with other devices on the same segment on the network level. Devices 28, 30, and 32, labeled Client 1, Client 2, and Client 3 respectively, are connected to the shared hub 20 to form another segment of the LAN. The LAN Segment 1 would be considered the local segment for communications between the devices 28, 30, and 32 while the LAN Segment 2 would be the remote segment for communications between the LAN Segment 1 and the device 26.

The LAN 12 is configured as shown for purposes of illustration and not of limitation. Other commercially available network hardware including repeaters, switching hubs, bridges, and media access units (MAUs), among others, may be included in constructing a particular LAN 12. Any number of devices may be attached to the LAN 12 which is structured according to the needs of the users. The LAN 12 comprises a system of hardware and cabling to form the physical layer according to the well-known Open Systems Interconnection (OSI) model.

Each of the devices 26, 28, 30, and 32 have network adapters commonly referred to as network interface cards (NICs) for hardware connection to the LAN 12. Each of the clients 26, 28, 30, and 32 has a physical hardware address commonly referred to as the media access control (MAC) or hardware address. MAC addresses are assigned by industry-wide agreement according to manufacturer and are in the form of a unique serial number for each NIC.

Each of the devices 26, 28, 30, and 32 also have an internet protocol (IP) or software address that is used on the software or network level of the OSI model. IP addresses are readily assignable by the network administrator and are sometimes assigned at boot up by the BOOTP or DHCP server (not shown) on the LAN which maintains a pool of unique IP addresses to draw from. The IP address for any particular device may change each time the device is booted upon the LAN.

The NIC passes along to the software layer of the device only those messages received for its specific MAC address or the MAC broadcast (address 0xFFFFFFFFFFFF) thus acting as a filter which reduces the burden on the software layer in each of the devices 26, 28, 30, and 32. It is necessary that an ARP (address resolution protocol) request be broadcast by a source device to dynamically map the IP address to the corresponding MAC address of the target device. If the target device is on the local segment, which is the same segment as the source device, the target device with the corresponding IP address responds with its MAC address to the source device and the communications session between the source and target devices may then begin.

Figure 2:
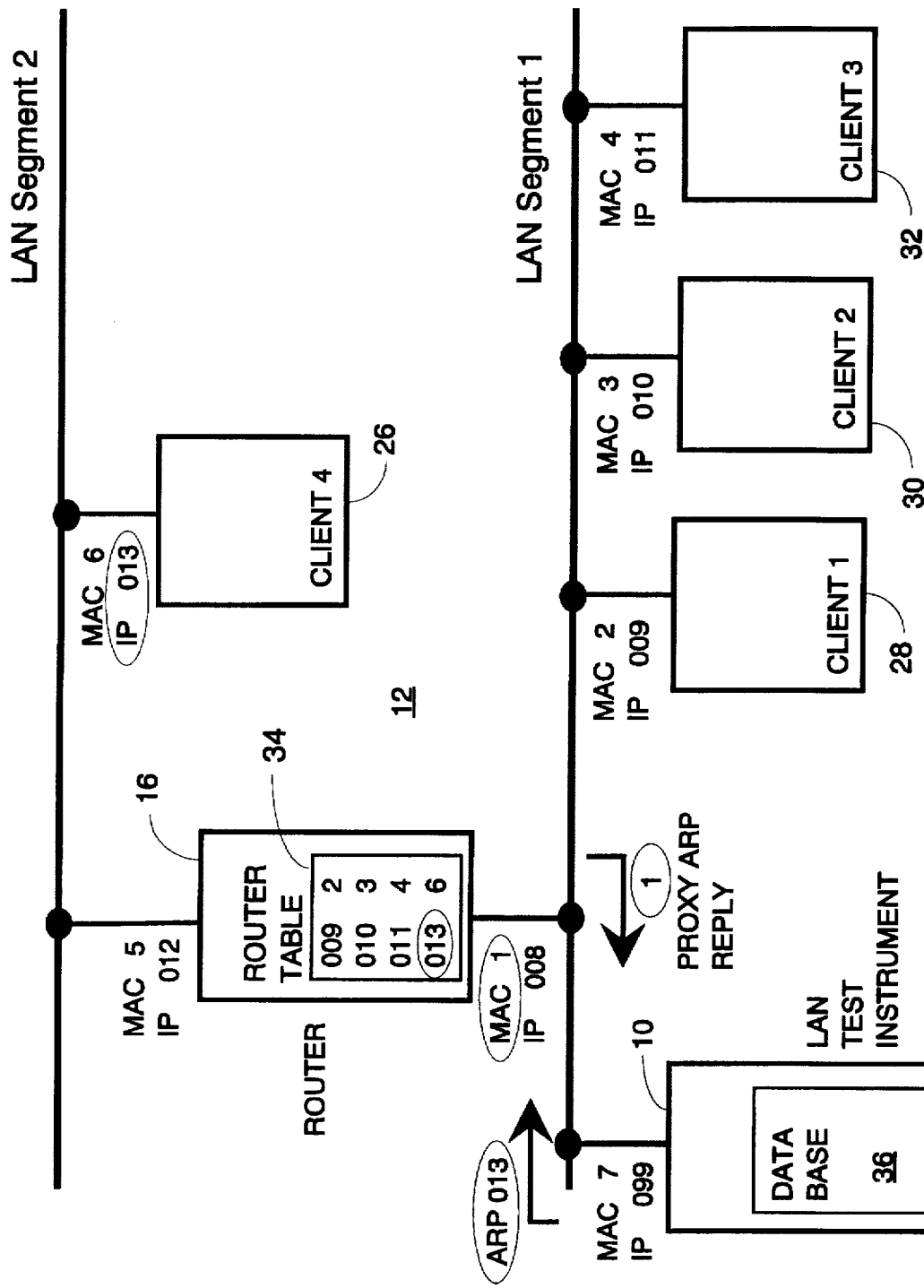
FIG. 2 is a simplified block diagram of the LAN in which a router replies by proxy ARP for a device on a remote segment according to the prior art.

FIG. 2 is a simplified block diagram of the LAN 12 (shown in FIG. 1) according to the prior art in which a router replies by proxy ARP for a target device on a remote segment in response to an ARP request by a source device. By industry convention, IP addresses are 32 bits in length and MAC addresses are 48 bits in length. For purposes of illustration, the IP and MAC addresses shown are simplified and abbreviated. The source device sending the ARP request is the LAN test instrument 10 which generates the ARP request in the conventional manner. The shared hub 18 collectively forms the LAN Segment 2 and the shared hub 20 collectively forms the LAN Segment 1.

The LAN test instrument 10 operates as the source device to send an ARP request in the conventional manner for the target device having a IP address of 013 which is the device 26 on LAN Segment 2. The router 16 does not forward ARP requests to other LAN segments by industry convention. Now, because the source and target devices are on different segments of the LAN 12, the ARP request sent by the LAN test instrument 10 on LAN Segment 1 would not normally be received by the device 26, the target device on the remote segment.

The LAN test instrument 10 contains a data base 36 for storing each of the responses to its ARP requests. It is critical that each of the responses received have its own entry in the data base 36 for further analysis according to the present invention.

The router 26, if its proxy ARP function is enabled, will respond to ARP requests for target devices on the remote segment with a proxy ARP reply containing the MAC address of a port of the router 16 connected to the local segment so that the router 16 may receive the information from the source device and forward it on to the target device on the remote segment. In the situation shown in FIG. 2, the router 16 replies to the ARP request for IP address 013 sent by the LAN test instrument 10 using proxy ARP for the device 26 with its own MAC address of 1.

The router 16 contains a router table 34 containing IP addresses and corresponding MAC addresses for various devices which provides for the proper forwarding of packets received from the source device to the target devices that the router 16 knows the locations of in the router table 34. Alternatively, if the router 16 receives an ARP request for a device on a remote segment that the router does not have in its router table, the router 16 replies in proxy ARP anyway for the unknown target device if the proxy ARP for the default route is activated as is commonly implemented in the industry. Proxy ARP for default route is a way for the router to accept the packets from the source device and to attempt to route the information to other routers on a default network path in order to eventually find a router that does have the location of the target device in its router table.

Figure 3:
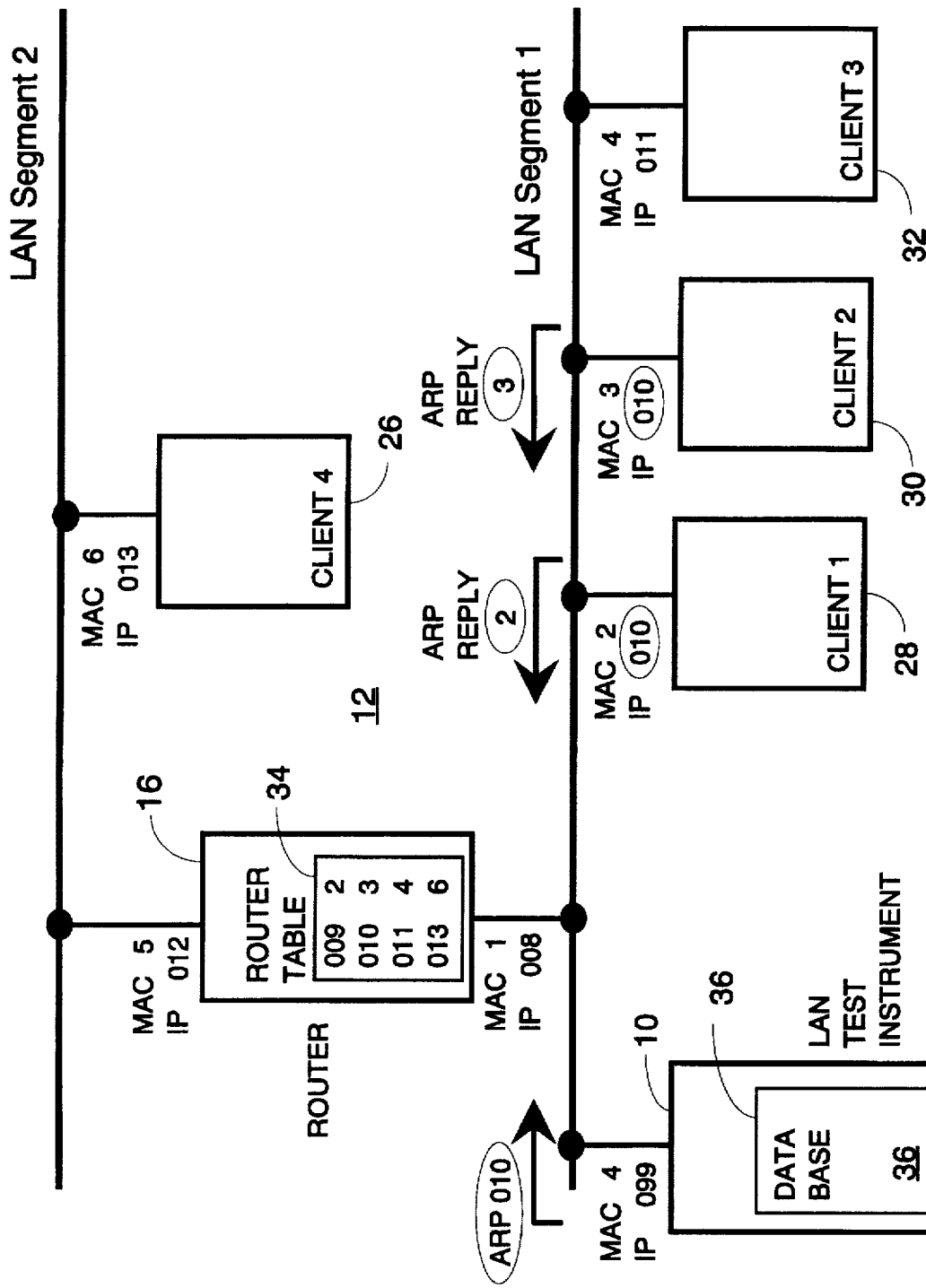
FIG. 3 is a simplified block diagram of the LAN in which two devices having duplicate IP addresses on a local segment reply to an ARP request.

FIG. 3 is a simplified block diagram of the LAN 12 showing a first problem of duplicate IP addresses between two devices on the LAN which is known in the prior art. The LAN test instrument 10 sends an ARP request in the conventional manner for the device having an IP address of 010. Devices 28 and 30 are misconfigured in that they both have the IP address of 010. Detection of duplicate IP addresses using the ARP command is known in the prior art.

Since both devices 28 and 30 receive the ARP request for IP address 010 from the LAN test instrument 10 and both reply with their respective MAC addresses of 2 and 3, the LAN test instrument 10 can receive both responses, create entries for each of them in the data base and detect a possible duplicate IP address problem pending further analysis according to the present invention.

Figure 4:
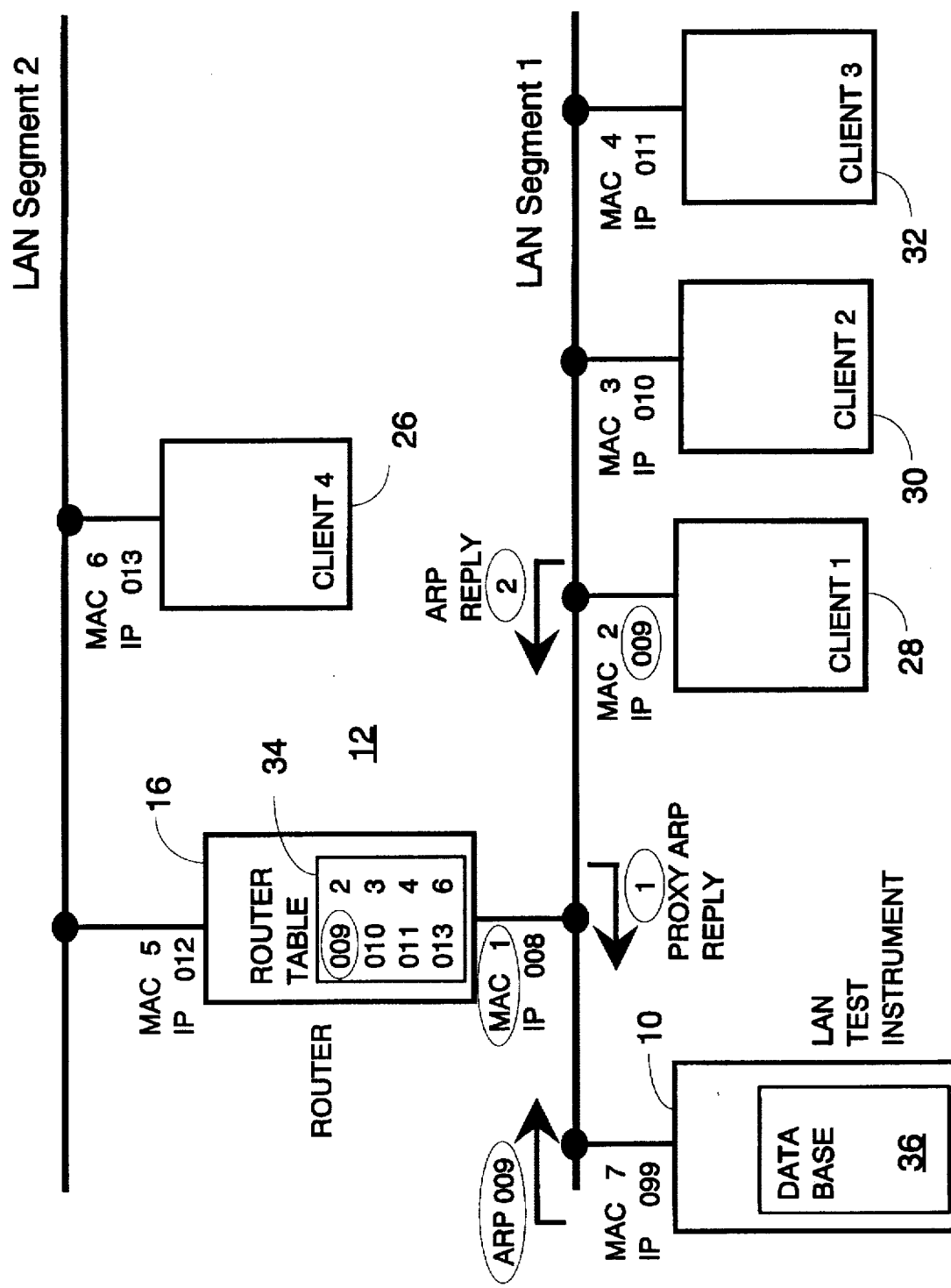
FIG. 4 is a simplified block of the LAN in which a misconfigured router replies by proxy ARP for a device on the local segment which is distinguishable from the replies of FIG. 3 by the LAN test instrument according to the present invention.

FIG. 4 is a simplified block diagram of the LAN 12 showing a second problem of a misconfigured router. The LAN test instrument 10 sends an ARP request in the conventional manner for the device having an IP address of 009 which is the device 28, now properly configured with a unique IP address of 009 on the LAN Segment 1. The device 28 receives the ARP request for the IP address of 009 from the LAN test instrument 10 and replies with its MAC address of 2.

Now, however, the router 16 is misconfigured so that it improperly replies to the ARP request for the device 28 which is a local host from the LAN test instrument 10 with a proxy ARP reply with its own MAC address of 1. The LAN test instrument 10 thus receives two responses to its ARP request for the IP address of 009. These two responses to the ARP request as received by the test instrument 10 in FIG. 4 are similar in nature to the two replies to its ARP request in the situation of FIG. 3 The two responses are saved as separate entries in the data base 36. As explained in further detail below, the present invention provides a method for further analyzing and detecting proxy ARP agents and routers running proxy ARP for devices on the local segment in order to distinguish the first and second problems shown in FIG. 3 and FIG. 4.

Figure 5A:
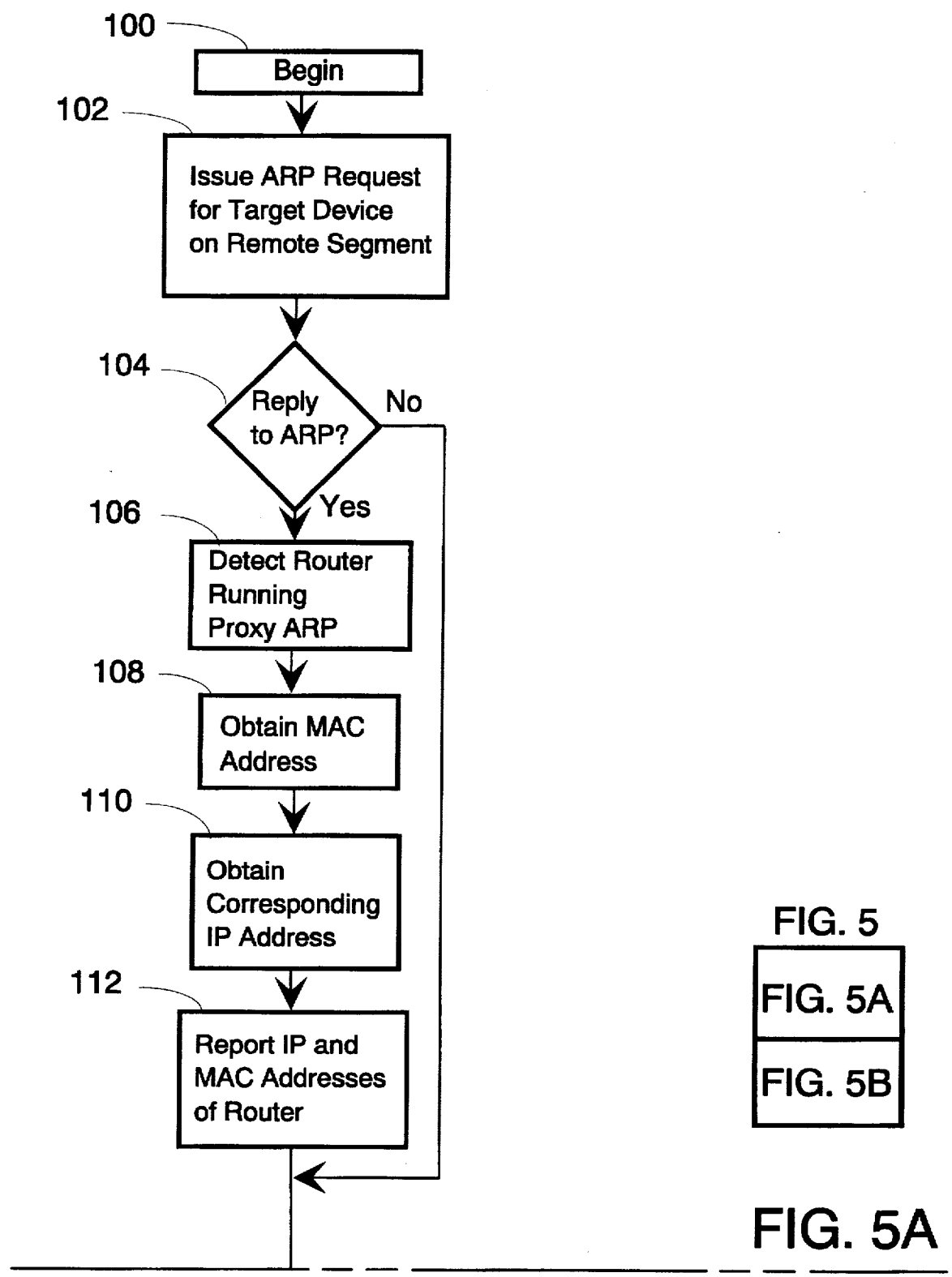
FIGS. 5A and 5B together comprise a flow diagram of the process of detecting proxy ARP replies according to the present invention.
Figure 5B:
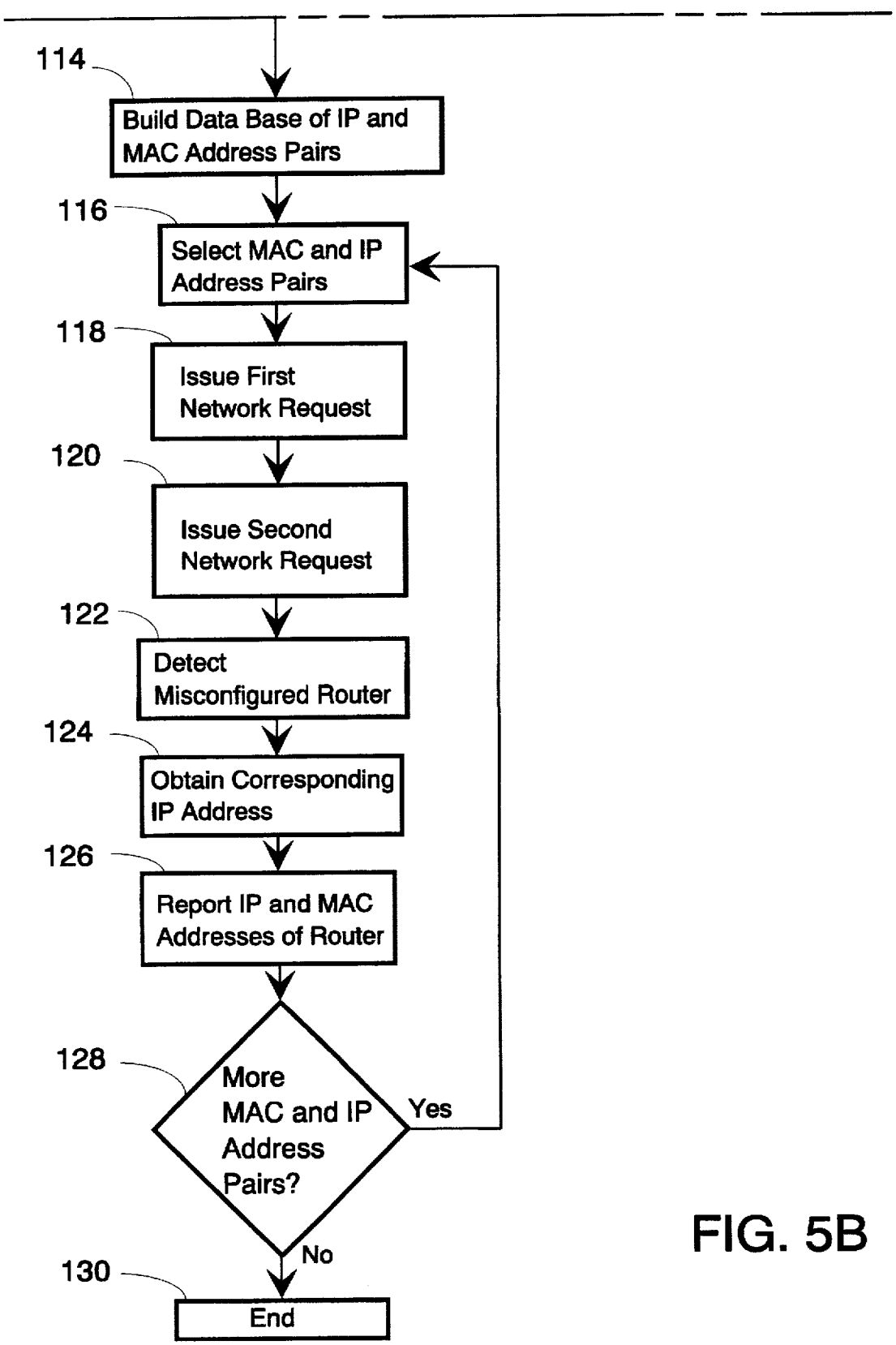

FIG. 5A and 5B collectively show a flow chart of the method for detecting proxy ARP replies and misconfigured routers according to the present invention. The present invention may be practiced in conjunction with other methods that actively search out duplicate IP addresses between devices on the LAN by sorting out the replies due to duplicate IP addresses from replies due to proxy ARP. Alternatively, the present invention may be practiced stand-alone to detect routers running proxy ARP for local hosts and for the default route. FIG. 5A illustrates the first portion of the method which detects routers running proxy ARP for the default route. FIG. 5B illustrates the second portion of the method which detects misconfigured routers running proxy ARP for local hosts.

The first and second portions of the method may be used stand-alone or in combination for the purpose of detecting proxy ARP replies and misconfigured routers so that phantom entries due to proxy ARP may be identified and eliminated from the data base 36. The first and second portions of the method are complementary in identifying phantom entries with the goal that the data base 36 only contain entries related to actual devices on the LAN.

Referring now to FIG. 5A, step 100 labeled Begin signals the start of the overall process according to the present invention. The step 100 may be initiated automatically by other processes in the LAN test instrument 10 such as a process for identifying duplicate IP addresses (not shown) or initiated manually by the test instrument user.

In step 102 labeled Issue ARP Request for Remote Host, the LAN test instrument 10 issues an ARP request for a target device having an IP address known not to be on the local segment of the LAN. In the preferred embodiment, the IP address of the remote host is a unique IP address reserved to the manufacturer of the LAN test instrument 10 which virtually ensures that the IP address is remote for any application. The remote host need not actually exist and the only requirement is that the IP address be for a device on a non-local segment of the LAN and that it be unique so that there is no corresponding entry in the router table 34. The default route is the last entry that is looked at by the router 16 in the router table 34 if the remote host is unknown. Other techniques for choosing a unique IP address for remote host may readily be adopted.

In step 104 labeled Reply to ARP?, the LAN test instrument 10 receives any responses to its ARP request in the conventional manner. If no responses are received, then there are likely no routers running proxy ARP for the default route and the first portion of the method ends. If one or more responses are received in response to the ARP request, then there is likely at least one router running proxy ARP for the default route on the local segment and the method continues in step 106.

In the step 106 labeled Detect Router Running Proxy ARP, the arrival of one or more responses in step 104 causes the conclusion that one or more routers is running proxy ARP for the default route. Every response received can be evaluated separately to reach independent conclusions for each router that responds in this manner.

In the step 108 labeled Obtain MAC Address, each of the responses in step 106 contains the MAC address of the responding device. The MAC addresses from each reply may be stored in a data base or register so that they may be matched with a corresponding IP address.

In step 110 labeled Obtain Corresponding IP Address, the IP address corresponding to the MAC addresses gathered in step 108 may be found. This may be done by consulting the data base 36 of IP and MAC addresses that has been gathered previously, for example an ARP cache, or by monitoring the traffic on the LAN to passively capture the corresponding IP address from the traffic destined for the desired MAC address. Once the corresponding IP address has been obtained, the IP and MAC address pair may be verified using an ICMP echo request with a time-to-live equal to one.

In step 112 labeled Report IP and MAC Addresses of Router, the step 110 has successfully obtained IP addresses for the router or routers having the corresponding MAC addresses. The pairs of MAC and IP addresses for the routers running proxy ARP for the default route is now reported to the instrument user, typically as a graphical or numerical display on the LAN test instrument 10, or to other processes within the LAN test instrument 10. Other entries in the data base 36 having the same MAC address as the MAC address of the router identified in the step 108 may be identified as phantom entries. Phantom entries may be appropriately tagged as such as phantom entries or simply deleted from the data base 36. The data base 36 may already exist with phantom entries to eliminate before the steps 100–112 are performed. Alternatively, the phantom entries may be rejected as they arrive in response to ARP requests from the LAN test instrument 10.

Referring to FIG. 5B, the second portion of the method according to the present invention is shown. In step 114 labeled Build A Database of IP and MAC Address Pairs, the LAN test instrument 10 builds a data base of IP and MAC address pairs. Various methods exist for finding IP and MAC addresses to fill the data base 36. Such methods for obtaining IP addresses may include passively monitoring the traffic on the local segment, actively soliciting network responses, or obtaining IP addresses from ARP caches from various devices on the LAN. In this way, the method according to the present invention may be used in conjunction with other methods which search for local and remotes hosts and which locate duplicate IP addresses. The MAC addresses and corresponding IP addresses for each of the hosts are stored as separate entries in a data base.

In step 116 labeled Select MAC and IP Address Pairs, certain MAC and IP address pairs which form entries in the data base 36 constructed in the step 114 may be targeted for further analysis. For example, one or more entries may share a common MAC address which may indicate a router replying in proxy ARP for a local host. The common MAC address would be the hardware address for a port on the router 16. Because the router may be replying in proxy ARP for a large number of devices, it is desirable to eliminate from the data base the entries that appear only as a result of a router running proxy ARP.

Such entries are considered phantom entries because they contain the MAC address of the port on the router 16 and the IP address of another host on the LAN. The present invention may be used to determine which of the entries having a common MAC address are phantom entries so that they may be appropriately tagged or eliminated from the data base 36. The router 16 may have multiple secondary IP addresses for a common MAC address. The present invention will correctly distinguish the entries that include the secondary IP addresses from the entries due to proxy ARP replies.

Alternatively, entries in the data base 36 that share duplicate IP addresses may be targeted for further analysis according to the present invention. It is desirable to distinguish between the first problem of devices having duplicate IP addresses on the LAN and the second problem of a misconfigured router replying in proxy ARP for local hosts. Each of these pairs is also amenable for further analysis according to the present invention to determine which of the entries in the data base are local hosts having duplicate IP addresses and which are routers running proxy ARP for local hosts.

Steps 118 and 120 are used to determine whether each entry in the data base 36 is local, remote, or due to proxy ARP reply to the LAN test instrument 10. Two active network requests are sent using different settings of the time-to-live (TTL) parameter that controls the number of times a message may be forwarded to discriminate between local and forwarded requests. The order in which the active network requests are sent is not critical. The results of this determination are then used to determine the validity of other selected entries, such as the other entries having a common MAC address or duplicate IP addresses. Other messaging protocols and network requests such as subnet broadcasts that control the number of hops through network devices in a manner similar to the TTL may be employed to generate messages that discriminate between local and remote segments to practice the present invention.

In the step 118 labeled Issue First Network Request, the LAN test instrument 10 issues an ICMP Echo Request for the target devices associated with each of the common MAC addresses and associated IP address pairs. The time to live (TTL) is set to one in the ICMP echo request in the conventional manner. Because the TTL is decremented by one for each time the request is forwarded by the router 16, the ICMP echo cannot be forwarded by the router 16 and is thus restricted to the communication with devices on the local segment. If the packet sent by the LAN test instrument 10 must be forwarded, the TTL decrements by one to reach zero and the ICMP echo request "dies" at the router 16 without reaching the target device on the local or remote segment. In this case, the router 16 may either return an error message that indicates the frame died or simply return nothing. In either case, there is assumed to be no response to the ICMP echo request.

The responses to each of the ICMP echo requests in the step 118 are received and stored in the data base for each of the common MAC address and associated IP address pairs. If a reply is received for a given MAC and IP address pair, it may be assumed that this MAC and IP address is a local host. If no response is received for the given MAC and IP address pair, the device may either be remote, there is a problem in connecting to the device, or the entry containing the MAC and IP address pair was due to a proxy ARP reply.

In the step 120 labeled Issue Second Network Request, the LAN test instrument 10 issues an ICMP echo Request for each of the common MAC address and associated IP address pairs in which no response was received in the step 120. Now, the ICMP echo request has the TTL number set to any number greater than one so that the TTL decremented by one for each hop in the conventional manner and continue to be forwarded to the device on the remote segment. The TTL number is preferably set to a large number to allow a reply by a device on a remote segment to the ICMP echo request through a reasonably large number of hops.

If no response is received, than the results are inconclusive because there was no connection to the device. If a response is received, then the device has responded through a path that has at least one hop through a router and is thus on a remote segment or is due to a proxy ARP reply for a local host.

In step 122 labeled Detect Misconfigured Router, misconfigured routers and proxy ARP agents may be detected by determining whether any of the entries in the data base 36 associated with the responses received in the step 114 are inconsistently local or remote hosts so that they may be eliminated from the data base. In eliminating phantom entries from the data base 36, any of the entries may be analyzed according to the steps 118 and 120 so that a label of local, remote, or due to proxy ARP may be assigned. Alternatively, a subset of entries having duplicate IP addresses or common MAC addresses may be separately analyzed.

In the case of a pair of entries having a duplicate IP address, if one entry appears local and the other appears forwarded, then the entry that appears forwarded is determined to be due to a misconfigured router running proxy ARP reply rather than an actual duplicate IP address. If multiple entries are local, then they are due to duplicate IP addresses. If multiple entries are forwarded, then they are due to multiple routers running proxy ARP.

In the case of a set of entries having a common MAC address, if all of the entries appear to be local, then it is most likely due to secondary IP addresses. If the entries are a mix of forwarded and local, then the forwarded entries are due to a router running proxy ARP for a local or remote host.

In step 124 labeled Obtain Corresponding IP Address, once the MAC address of the router has been determined, the corresponding IP address may be obtained. This may be done by consulting the data base 36 of IP and MAC addresses that has been gathered previously, for example an ARP cache, or by monitoring the traffic on the LAN to passively capture the corresponding IP address from the traffic destined for the desired MAC address. Once the corresponding IP address has been obtained, the IP and MAC address pair may be verified using an ICMP echo request with a time-to-live equal to one.

In step 126 labeled Report IP and MAC Addresses of Router, the MAC address and corresponding IP address of the router that has been obtained in the step 124 may be reported to the user of the LAN test instrument 10 or to other processes operating within the LAN test instrument 10 in order to eliminate phantom entries in the data base 36.

In step 128 labeled More MAC and IP Address Pairs?, if there are more entries to analyze, the method loops back to the step 116 and repeats the analysis for another entry.

In step 130 labeled End, the process according to the present invention terminates. The process may be readily restarted and operated as needed in order to further detect misconfigured routers and proxy ARP agents.

Figure 6:
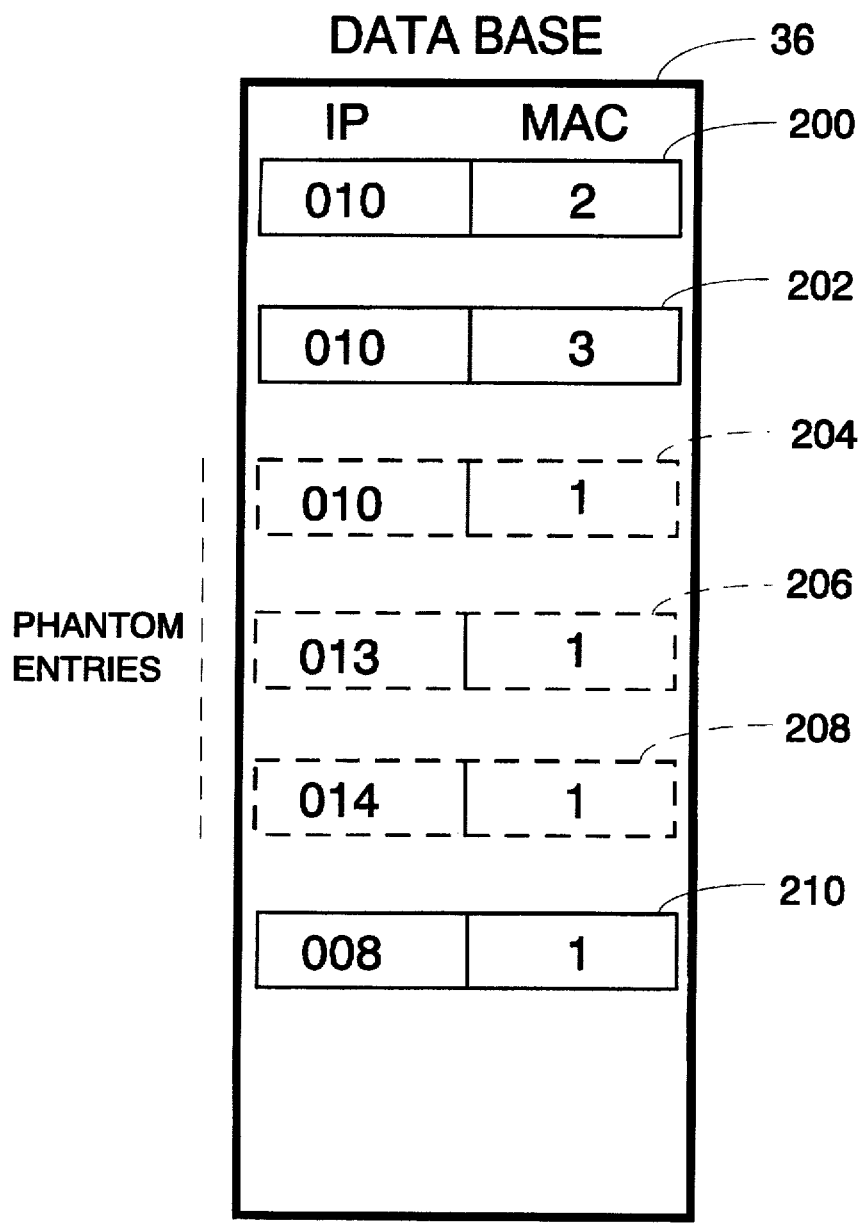
FIG. 6 is an illustration of the data base in the LAN test instrument with phantom entries due to proxy ARP agents that may be detected according to the present invention.

Referring now to FIG. 6, there is shown a diagram that symbolizes entries in the data base 36 (shown in FIG. 2) that is contained within the LAN test instrument 10. The data base may be implemented in digital memory in the conventional manner.

The data base contains entries 200-208 which represent the MAC and IP address pairs received from replies to active network requests sent on the LAN 12 by the LAN test instrument 10. The entries 204-208 are not relate to actual physical devices in the LAN ("phantom entries") as shown if there is a router connected to the LAN 12 that is running proxy ARP. The method according to the present invention allows for detection of the phantom entries due to misconfigured routers replying in proxy ARP for local hosts and for remotes hosts on the default route. The phantom entries may then be appropriately tagged or eliminated from the data base 36. The entries 200-208 may be analyzed in any particular order. All of the entries 200-208 may be analyzed or selected subsets of the entries 200-208, such as those entries duplicate IP addresses or common MAC addresses may be analyzed separately.

The entries 200, 202 and 204 each share a duplicate IP address but with differing MAC addresses. This situation illustrates the combination of two situations. First, the router 16 (shown in FIG. 3) which a MAC address of 1 is replying in proxy ARP for the device 30 which has an IP address of 010. This proxy ARP reply is recorded as the entry 204. The ARP reply of the device 30 is shown as the entry 202. In addition, the device 28 has a duplicate IP address problem by sharing the IP address 010. It is desirable that the problems of a misconfigured router and devices having duplicate IP addresses be distinguishable to enhance the ability of the user of the LAN test instrument 10 to analyze and diagnose problems in the LAN 12.

Using the method illustrated in the process steps shown in FIG. 5A and 5B, the entry 204 would be found to be remote while the entries 200 and 202 would be forwarded, thus revealing the entry 204 to be the result of a proxy ARP reply. The entry 204 could be appropriately tagged or eliminated from the data base 36 and an error message to the user generated indicating that a misconfigured router that is improperly replying in proxy ARP for the device 30 which is a local host. The entries 200 and 202 now clearly identify the duplicate IP problem between the devices 28 and 30.

In a similar approach to verifying the duplicate IP address above, each of the entries having a common MAC address can be examined according to the present invention. The entries 204, 206, and 208 share a common MAC address of 1. Since a MAC address may be assumed to be unique, it is likely that the same device is replying to multiple ARP requests. The entry 204 may be handled in the same manner as above with the identification of the router 16 as a misconfigured router. The entry 206 is the result of the proxy ARP reply of the router 16 for the device 26 which is on the LAN Segment 2, a remote segment. The entry 206 would be found to be forwarded and the entry 206 could be appropriately tagged or deleted in the data base 36 according to the present invention because it is a proxy ARP reply for a remote device.

Rather than targetting a specified subset of the entries, the method according to the present invention may be applied to each and every entry in the data base 36 in the same manner as described above, with equally effective results.

The entry 208 is the result of the proxy ARP reply of the router 16 for a remote host that is not in the router table 34. The router 16 thus has proxy ARP for the default route enabled and a message to the user to this effect may be sent to the user of the LAN test instrument 10 and the entry 208 deleted from the data base.

While the entries 204, 206, and 208 could be deleted because they are proxy ARP replies, they have revealed the MAC address of the port of the router 16 connected to the local segment, in this case LAN Segment 1. The corresponding IP address of 008 of this port could be found through other means, such as monitoring the traffic on the LAN 12.

Once the corresponding IP address of the router 36 is found, a new entry 210 for the physical port of the router 16 connected to the LAN Segment 1 with the IP address of 008 and MAC address of 1 may be added to the data base 36 as shown. The IP and MAC address pair in the entry 210 may be verified using an ICMP echo request with a time-to-live equal to one since the active network request does not need to be forwarded.

It will be obvious to those having ordinary skill in the art that many changes may be made in the details of the above described preferred embodiments of the invention without departing from the spirit of the invention in its broader aspects. For example, the method according to the present invention may be implemented in a variety of processing environments including personal computers having the appropriate hardware and software. The first and second network requests of the present invention may be readily adopted for a variety of network protocols and message types such as UDP pings, SNMP pings and subnet broadcasts that provide the ability to discriminate between local and remote segments. Therefore, the scope of the present invention should be determined by the following claims.

What we claim as our invention is:

1. In a LAN test instrument for coupling to a LAN, a method for detecting a misconfigured router, comprising:
   (a) building a data base containing entries corresponding to devices on said LAN, each of said entries containing a pair of MAC and IP addresses;
   (b) issuing a first network request to said devices on said LAN corresponding to each of said entries, said first network request allowing no forwarding from a local segment of said LAN;
   (c) issuing a second network request to said devices on said LAN corresponding to each of said entries, said second network request allowing forwarding from said local segment of said LAN;
   (d) if there is no reply to said first network request and there is a reply to said second network request for at least one of said entries, detecting a proxy ARP reply for said one of said entries; and
   (e) if said one of said entries has an IP address corresponding to a local host, detecting said misconfigured router.

2. A method for detecting a misconfigured router according to claim 1 further comprising:
   (a) obtaining a MAC address of said misconfigured router;
   (b) obtaining a corresponding IP address of said misconfigured router; and
   (c) reporting said MAC address and said corresponding IP address to other processes in said LAN test instrument.

3. A method for detecting a misconfigured router according to claim 2 further comprising:
   (a) saving said MAC address and said corresponding IP address as an entry in a data base in said LAN test instrument; and
   (b) identifying other entries in said data base having said MAC address as phantom replies.

4. A method for detecting a misconfigured router according to claim 1 wherein said LAN operates using a TCP/IP protocol.

5. A method for detecting a misconfigured router according to claim 4 wherein said first network request comprises an ICMP echo request with a time-to-live equal to one.

6. A method for detecting a misconfigured router according to claim 4 wherein said second network request comprises an ICMP echo request with a time-to-live substantially greater than one.

7. In a LAN test instrument for coupling to a LAN containing a plurality of devices, a method for building a data base, comprising:
   (a) issuing active network requests to each of said devices;
   (b) receiving responses from said devices according to said active network requests and to passive monitoring of said LAN;
   (c) adding entries to said data base according to each of said responses;
   (d) issuing a first network request to devices on said LAN corresponding to each of said entries, said first network request allowing no forwarding from a local segment of said LAN;
   (e) issuing a second network request to devices on said LAN corresponding to each of said entries, said second network request allowing forwarding from said local segment of said LAN; and
   (f) if there is no reply to said first network request and there is a reply to said second network request for at least one of said entries, detecting said one of said entries to be a phantom entry.

8. A method for building a data base according to claim 7 further comprising deleting said phantom entry from said data base.

9. A method for building a data base according to claim 7 further comprising appropriately tagging said phantom entry in said data base.

10. A method for building a data base according to claim 7 wherein said LAN operates using a TCP/IP protocol.

11. A method for building a data base according to claim 10 wherein said first network request further comprises an ICMP echo request with a time-to-live equal to one.

12. A method for building a data base according to claim 10 wherein said second network request further comprises an ICMP echo request with a time-to-live substantially greater than one.

13. In a LAN test instrument for coupling to a LAN, a method for detecting a router running proxy ARP for its default route, comprising:
   (a) issuing an ARP request on said LAN for a remote host having a unique IP address;
   (b) if said router replies to said ARP request, detecting said proxy ARP;
   (c) obtaining a MAC address of said router;
   (d) obtaining an IP address corresponding to said MAC address for said router;
   (e) saving said MAC address and said IP address for said router as an entry in a data base in said LAN test instrument; and
   (f) identifying other entries in said data base having said MAC address for said router as phantom replies.

14. A method for detecting a router running proxy ARP for its default route according to claim 13 further comprising reporting said MAC address and said IP address for said router to other processes in said LAN test instrument.

15. A method for detecting a router running proxy ARP for its default route according to claim 13 wherein said LAN operates using a TCP/IP protocol.

* * * * *